United States Patent [19]

Reeder et al.

[11] Patent Number: 5,262,092
[45] Date of Patent: Nov. 16, 1993

[54] SYNTHETIC COMPOSITE FUEL METERING MEMBRANE

[75] Inventors: Michael F. Reeder; James E. Van Allen, both of Cass City, Mich.

[73] Assignee: Walbro Corporation, Cass City, Mich.

[21] Appl. No.: 9,558

[22] Filed: Jan. 26, 1993

[51] Int. Cl.⁵ .................................. F02M 17/04
[52] U.S. Cl. .................... 261/35; 92/103 F;
    92/103 SD; 428/254; 261/DIG. 68
[58] Field of Search ............ 428/254; 92/103 SD,
    92/103 F, 103 R; 261/35, DIG. 68

[56] References Cited

U.S. PATENT DOCUMENTS

| | | | |
|---|---|---|---|
| 2,998,343 | 8/1961 | Gold et al. | 92/103 F |
| 3,045,605 | 7/1962 | Nutten et al. | 261/DIG. 68 |
| 3,104,617 | 9/1963 | Barr | 92/103 SD |
| 3,523,857 | 8/1970 | Crosland | 92/103 F |
| 3,601,102 | 8/1971 | Schneider et al. | |
| 3,633,557 | 1/1972 | Tuckey et al. | |
| 3,743,253 | 7/1973 | Tuckey et al. | |
| 4,349,593 | 9/1982 | Blechstein | 428/254 |
| 4,510,192 | 4/1985 | Inoue et al. | 428/254 |
| 4,615,934 | 10/1986 | Ellison | 428/254 |
| 4,828,909 | 5/1989 | Davis et al. | 428/254 |
| 4,868,038 | 9/1989 | McCullough, Jr. et al. | 428/254 |

FOREIGN PATENT DOCUMENTS

| | | |
|---|---|---|
| 0008142 | 1/1982 | Japan . |
| 717602 | 10/1954 | United Kingdom ........ 428/254 |

Primary Examiner—Tim Miles
Attorney, Agent, or Firm—Barnes, Kisselle, Raisch, Choate, Whittemore & Hulbert

[57] ABSTRACT

A synthetic composite flexible diaphragm of a fabric of warp-knitted polyester fibers and an elastomeric polymer coating applied only to one side of the fabric and disposed in interstices between the fibers to provide when cured a barrier at least substantially impervious to liquid fuel.

11 Claims, 3 Drawing Sheets

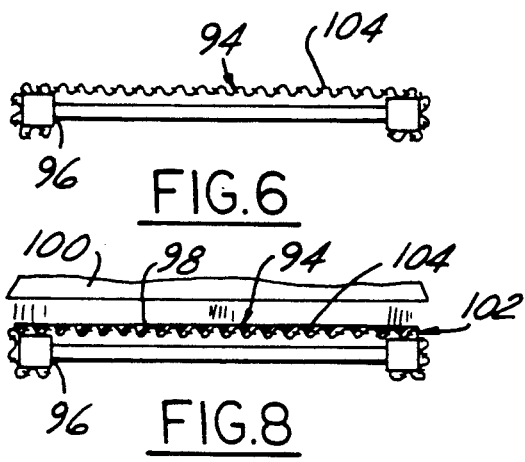
FIG.6
FIG.8
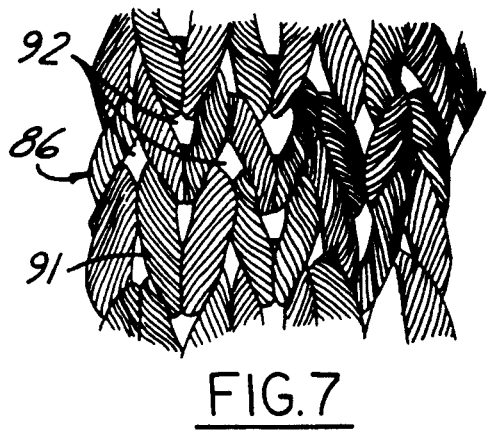
FIG.7
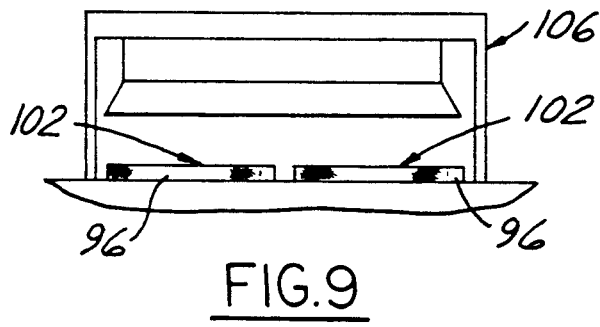
FIG.9
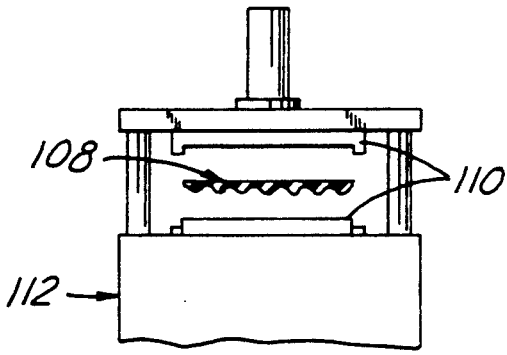
FIG.10
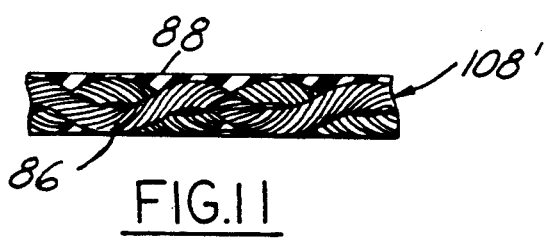
FIG.11
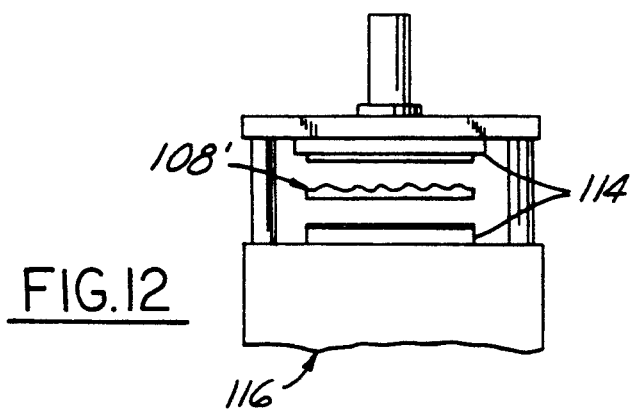
FIG.12

SYNTHETIC COMPOSITE FUEL METERING MEMBRANE

FIELD OF THE INVENTION

This invention relates to diaphragms and more particularly to an improved diaphragm and method of making diaphragms for carburetors and the like.

BACKGROUND OF THE INVENTION

Diaphragm carburetors generally have a flexible diaphragm disposed in a fuel chamber which opens to main and idling jets or orifices. Typically, the diaphragm divides the chamber into a wet chamber side which is supplied with fuel and is subjected to sub-atmospheric pressure during operation of the engine and a dry chamber side which may be subjected to atmospheric pressure. The diaphragm controls a fuel inlet valve disposed between a supply of fuel and the wet chamber side. As the engine draws fuel from the wet chamber side, the quantity of the fuel in the wet chamber will decrease, and the diaphragm will move against the bias of a spring to open the needle valve and allow fuel to enter the chamber.

In operation, the diaphragm repeatedly opens and closes the inlet needle valve so that fuel can enter the diaphragm chamber in response to sub-atmospheric pressure in the throat of the carburetor. Accordingly, a certain amount of fuel can be maintained in the diaphragm chamber at a substantially constant pressure to supply fuel to the main and idling jets. The diaphragm must be extremely flexible because the valve must open and close rapidly with a small pressure differential which is typically one to two inches of water. It must also operate over a wide temperature range of about $-40°$ F. to $180°$ F.

For over 40 years the small engine industry has experienced many problems in the manufacture, in service use, and performance of fuel metering diaphragms. Currently most diaphragms are made of a rubber coated silk material. In use, the performance characteristics of these diaphragms change and deteriorate substantially. The inventors have discovered that the silk fibers absorb moisture from the atmosphere and/or the fuel, resulting in a diaphragm that changes its performance characteristics depending on the ambient weather conditions, such as temperature and humidity, and the moisture content of the fuel which severely limits the performance of the fuel metering diaphragms. Other materials, such as woven nylon, have also been found to be ineffective because they produce a diaphragm which is too thick and/or inflexible to adequately respond to small pressure changes. When in prolonged contact with liquid fuel, the coating also swells or increases in volume and deteriorates in hardness, tensile strength and ultimate elongation.

Additionally, currently available manufacturing processes are unable to produce diaphragms having the dimensional tolerances and performance characteristics required. A two-ply rubber coating is used with one ply or layer being applied to both sides of a sheet of material from which the diaphragm is cut. This increases the rigidity of the material which, when coupled with the above mentioned problems of the material, results in a diaphragm that in incapable of consistently performing as required.

Previously, the silk fabric with an uncured rubber coating on both sides was heated in an oven to fully cure the rubber and then cooled to room temperature. Thereafter, a stack or pile of several of the resulting flat composite sheets were placed in a multiple cavity mold and simultaneously molded under a force of 6–20 tons for a 54 cavity mold at a temperature of 330° to 375° F. for 4 to 8 minutes to form a bellows or convolution in the diaphragm. Thereafter, the molded sheets were cooled and trimmed in a die and press to cut or blank out the individual diaphragms from each sheet. When in service in a carburetor, the convolution tends to become smaller, diminish or even disappear and thus is not permanent and degrades performance of the diaphragm.

Since up to four cured two ply rubber coated sheets are molded at the same time to form the bellows, they are subjected to an uneven application of pressure and heat. This results in different performance properties for each diaphragm.

SUMMARY OF THE INVENTION

A fuel metering diaphragm embodying this invention has a warp knit fabric, preferably of polyester, with an elastomer coating applied to only one side of the fabric and disposed in the interstices of the fabric to provide a fuel resistant barrier. The elastomer is applied to only one side of a tensioned sheet of the fabric and one coated sheet at a time is molded under heat and pressure to dispose the elastomer in the interstices of the fabric, vulcanize the coating on the fabric and permanently form the desired contour of the diaphragm.

Objects, features and advantages of this invention are to provide a diaphragm having greater moisture resistance, enhanced flexibility, improved consistency when mass produced, greatly increased in service useful life, flexibility and tensile strength, and of simple design and economical manufacture and assembly.

BRIEF DESCRIPTION OF THE DRAWINGS

These and other objects, features and advantages of this invention will be apparent from the following detailed description, appended claims and accompanying drawings in which:

FIG. 6 is an end view of the tricot knit fabric stretched over a frame;

FIG. 7 is a fragmentary and enlarged top view of the fabric showing the warp knit polyester fibers;

FIG. 8 is an end view of the stretched fabric with the elastomer coating being applied with a doctor blade;

FIG. 9 is an end view of a heater assembly for the composite fabric and coating;

FIG. 10 is an end view of a press and mold assembly;

FIG. 11 is an enlarged and fragmentary cross section of the fabric with the elastomer coating applied to only one side and cured;

FIG. 12 is an end view of a trimming and cutting die and press; and

DESCRIPTION OF THE PREFERRED EMBODIMENT

Figure 1:
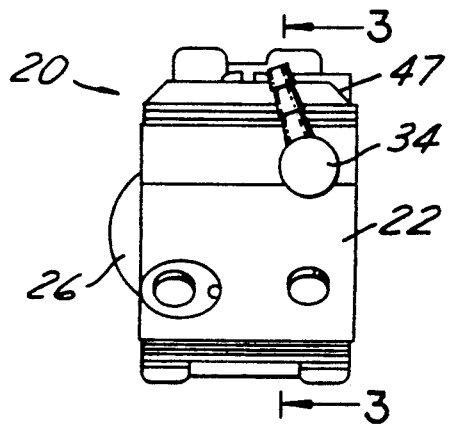
FIG. 1 is an end view of a carburetor assembly.
Figure 2:
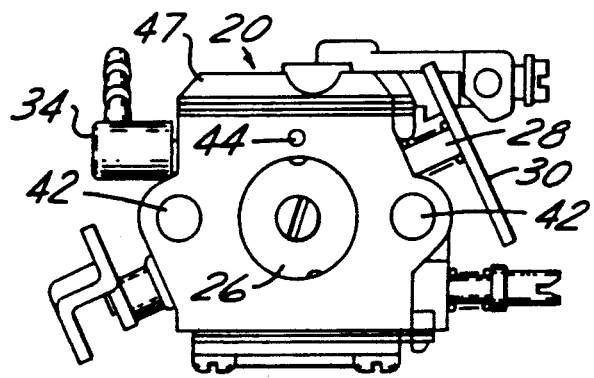
FIG. 2 is a side view of the carburetor assembly.
Figure 3:
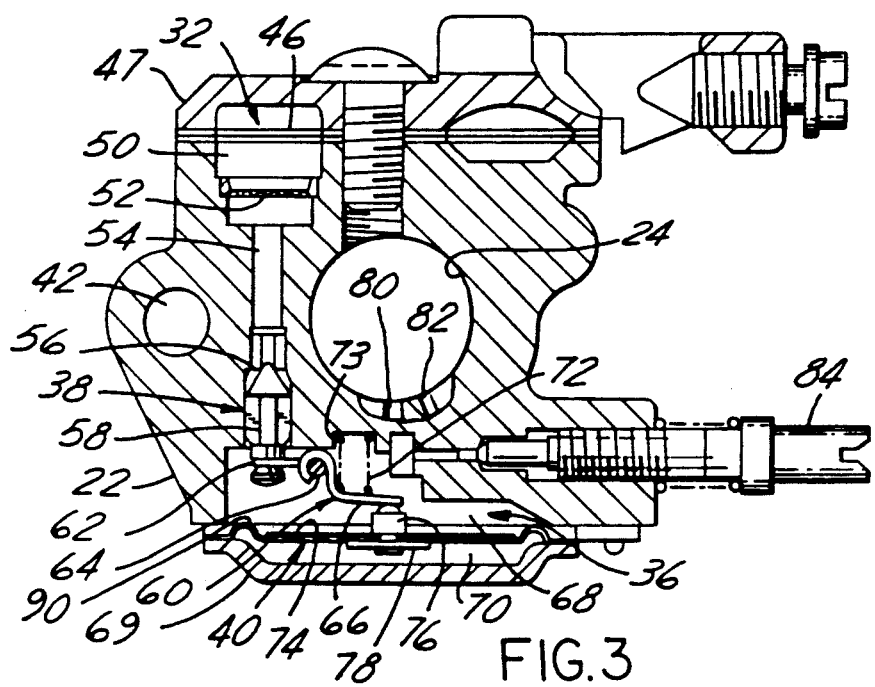
FIG. 3 is a view taken along line 3—3 in FIG. 1.

As illustrated in FIGS. 1-3, a conventional fuel pump and carburetor 20 for a two cycle small engine has a main body 22 with a mixing passage 24 in which a throttle valve 26 is mounted upon a shaft 28 controlled by a lever 30. A fuel pump 32 in the body receives fuel from a fuel inlet 34 and delivers it to a carburetor diaphragm chamber 36 through a diaphragm controlled inlet valve 38 in a conventional circuit including the fuel pump, the inlet valve, and a fuel metering diaphragm 40 embodying this invention. The carburetor is attached to the engine through mounting holes 42.

Small passages 44 opening into the mounting face of the carburetor (FIG. 2) receive engine crankcase pressure pulses for actuating a diaphragm 46 of the fuel pump received on the top of the carburetor body under a top plate or housing cap 47.

Referring to FIG. 3, in use, the pump 32 delivers fuel to the metering valve assembly 38 through a chamber 50 with a filter screen 52 therein and a passage 54 terminating at a valve seat 56. The valve assembly has a needle valve 58 which is actuated by a lever arm 60 connected at one end 62 to the valve, fulcrumed between its ends at 64 and having a control finger 66 actuated at its free end by the diaphragm 40. The diaphragm in cooperation with the body defines a fuel chamber 68 and in cooperation with a cover plate 69 defines a dry or air chamber 70 communicating with the atmosphere. The needle valve 58 is yieldably urged to its closed position bearing on the seat 56 by a coil spring 72 and is actuated to an open position by movement of the diaphragm 40. The coil spring is received in a pocket 73 in the body and bears on the finger 66 of the lever arm.

Preferably, the diaphragm has a backing disc 74, and a plunger 76 with a shank extending through the disc, the diaphragm and a washer 78 which are staked together in assembled relationship. Fuel in chamber 68 is supplied to a main metering jet 80 and idle jets 82 through passages (not shown) communicating with the fuel chamber 68. If desired, needle valve assemblies 84 (only one of which is shown), can be provided to adjust the quantity of fuel supplied to the main jet and the idle jets.

In use, as fuel is drawn from the chamber 68, the quantity of fuel therein will decrease and the differential pressure on the diaphragm will move the lever arm 60 against the bias of the spring 72 in a counter-clockwise direction (as viewed in FIG. 3), to open the valve 58 to allow fuel to enter the chamber 68. As the chamber fills with additional fuel, the diaphragm will tend to move the lever arm clockwise and close the needle valve to thereby regulate the pressure of the fuel within the chamber. When the engine is under load, and particularly when operating at full throttle, fuel flows rapidly into the chamber which causes the diaphragm to cycle or fluctuate quite rapidly. Thus, for the carburetor to function properly under a large variety of operating conditions, it is necessary that the diaphragm be very flexible and yet still be relatively strong and impervious to liquid fuel and not deteriorate in use due to repeated flexing and contact with the liquid fuel.

Figure 4:
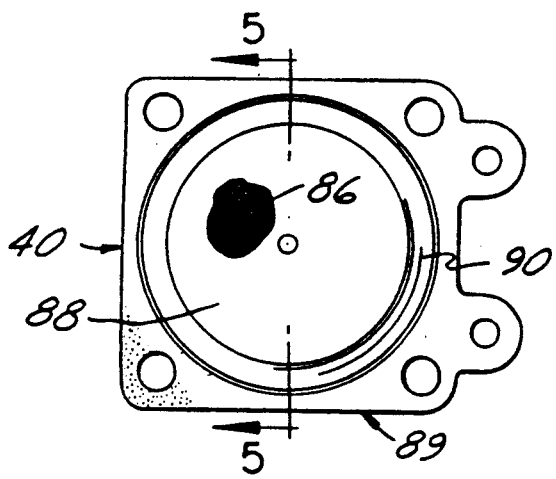
FIG. 4 is a top view of a diaphragm of the present invention with a cutaway portion showing the tricot knit fabric.
Figure 5:
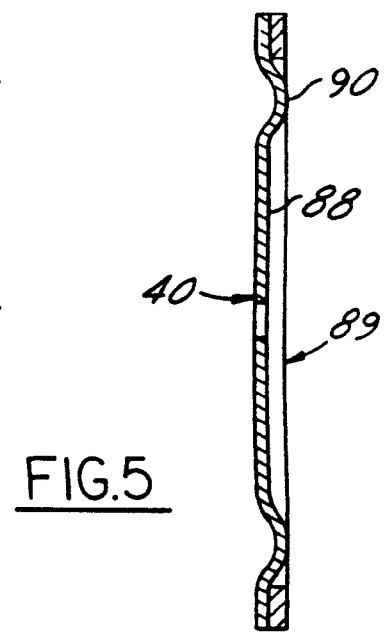
FIG. 5 is a sectional view taken along line 5—5 of FIG. 4.

The diaphragm 40 of the present invention, as seen in FIGS. 4 and 5, comprises a thin sheet of knit fabric 86 preferably of polyester which has been coated on only one side (preferably the fuel chamber 68 side) with an elastomer 88 and molded to form a typical bellows 90 with a convolute shape. Desirably, a sealing gasket 89 is attached to the fabric adjacent its periphery and outside of the convolution.

One feature of the present invention is that the fabric 86 is preferably a warp knit fabric. A knit fabric is composed of a series of interconnecting loops which may be prepared in its simplest form from a single yarn. By means of a needle, a loop is formed in a yarn 91 and is cast off when the needle draws a second loop through the first loop. The process is then repeated, to form a chain of loops interconnecting with adjacent chains to form a fabric. FIG. 7 shows the basic structure of the warp knit fabric 86 with interconnecting loops of yarn 91 with interstices 92 between the yarn. As viewed in FIG. 7, the lines of loops running left to right are called "courses"; and those running from top to bottom are called "wales".

The knit fabric 86 is a plain warp knit fabric preferably of polyester fibers. Warp knit and weft knit are the basic types of knit fabrics. Warp-knit fabrics are manufactured by passing each end of the fibers through its own needle forming a loop which intersects with adjacent loops. Most warp-knits are made on a tricot machine, as is known in the knitting industry. The resulting fabric is one of a tight weave having great strength, flexibility and moisture resistance.

Preferably, the fabric is a tricot warp knit fabric of Dacron ® polyester fibers and has a nominal thickness of 0.004 to 0.010 and preferably 0.005 to 0.007 of an inch as determined by American Society for Testing Materials (ASTM) procedure D-1777, a weight of 0.5 to 3.0, desirably 0.6 to 1.0, and preferably about 0.75 ounces per square yard as determined by ASTM procedure D-3776 with the courses having 36 to 58, and preferably 46 threads per inch, and the wales having 30 to 40 and preferably 34 threads per inch, as determined by ASTM procedure D-3887. Preferably, this fabric has a transverse break strength of 10 to 20 pounds and a longitudinal break strength of 15 to 25 pounds as determined by the grab test method of ASTM procedure D-5034. Preferably, the fabric has a Mullen burst strength of 45 to 75 psi as determined by ASTM procedure D-3786. Preferably, the threads of the fabric have a maximum denier of 20.

The tricot knit polyester fabric is coated on only one side with an elastomeric polymer, which is preferably a polyacrylonitrile butadiene rubber (NBR). Preferably, this polymer is a medium acrylonitrile butadiene copolymer that is compounded with various solvents, accelerators, nucleating agents, vulcanizing agents, plasticizers, release agents, etc., to optimize fuel resistance and flexibility. Preferably, the compounded NBR has a Money viscosity of 40 to 60, hardness on the Shore A scale of 30 to 40 points under ASTM procedure D-2240, and under ASTM procedure D-412, a tensile strength of at least 1500 psi, an ultimate elongation of at least 800% and a Young's modulus of elasticity of at least 80 psi at 100% elongation.

Vulcanized samples of the compounded NBR after being soaked in the specified fuel at room temperature for seventy hours preferably have the following properties:

| Property | ASTM Test Procedure | ASTM D471 Reference Fuel B | ASTM D471 Reference Fuel C |
|---|---|---|---|
| Maximum Hardness Decrease in PTS | D2240 | 10 | 10 |
| Maximum Tensile Strength Decrease in % | D412 | 60 | 80 |
| Maximum Ultimate Elongation Decrease in % | D412 | 35 | 50 |
| Maximum Volume Increase in % | D471 | 20 | 35 |
| Maximum Dryout Volume decrease in % | D471 | 15 | 20 |

Other suitable materials are fabrics with warp knit synthetic fibers with high moisture resistance such as fibers of polyaramid or polyamide (Nylon) having similar physical properties to the preferred polyester tricot knit fabric and elastomeric polymer coatings of fluorosilicones or low temperature fluoroplastics or fluorocarbons (Viton® GFLT).

The knit fabric is coated on only one side with the elastomeric polymer. While being coated, preferably the fabric is tensioned or stretched to a taut and generally planar condition. To facilitate tensioning the fabric, preferably about one inch of the material on each side is heated and fused to provide strips along the side edges for feeding and handling the fabric. This keeps the material from "necking down" when tension is applied to the fabric during the coating process and produces a relatively stress-free finished composite membrane material for molding.

When a relatively small quantity of coated fabric is produced, a piece 94 of fabric 86 may be tensioned or stretched to a taut and generally planar condition, as shown in FIG. 6, by stretching it over a carrier frame 96 and wrapping the ends of the piece about the frame. After a piece of fabric is tensioned and framed, a coat or thin layer 98 of the compounded elastomer is applied to one side, preferably by using a doctor blade 100 as shown in FIG. 8 to produce a composite sheet or membrane 102. The elastomer is applied relatively uniformly over only one surface or face 104 of the fabric. In applying the compounded elastomer, only sufficient force is used to insure that the elastomer adheres to the fabric. Preferably, the wetting of the fabric by the elastomer is minimized so that the courses and wales of the fabric will not be adhesively "locked up" which reduces the overall flexibility of the finished composite membrane. The fabric, not the elastomer, is believed to be the primary contributor to the flexibility of the molded diaphragm. After coating and before vulcanizing, the coated composite fabric preferably has a nominal thickness of about 0.012 to 0.018 of an inch.

To facilitate further handling, preferably before molding, the elastomer is allowed to develop a tacky condition by partially drying or slightly curing it, which may be accomplished by exposure at room temperature or if desired by heating to an elevated temperature the composite sheet 102. The composite sheet may be preheated by placing it in an oven 106, as shown in FIG. 9, for about 5 to 20 minutes with an oven air temperature of about 150° F. to 200° F.

Thereafter, the coated sheet 102 is removed from the carrier frame, dusted with a conventional mold releasing agent, and cut into blanks 108 of the appropriate size for the mold. For a mold 110 having 36 cavities laid out in a generally square (6×6) arrangement, these blanks are typically about 10"×10".

As shown in FIG. 10, one blank 108 at a time is placed in the open mold 110 which is closed by a press 112 to apply pressure and heat to the composite blank to force the elastomer into the interstices 92 between the fibers of the knit fabric, to cure the elastomer and to produce the bellows or convolute shape in the finished diaphragm 40. The mold is preheated to about 310° to 370° F. and preferably to 340° F. to 360° F. The composite blank has a residence time in the closed mold of about to 4¼ minutes and preferably 3¼ to 3¾ minutes, while being subjected to a molding force of 10 to 15 tons or about 220 to 330 pounds per square inch of the area of one face of the composite blank received in the mold. Preferably, to permit gases to escape from the mold, it is vented or it may be periodically rapidly slightly opened and then closed several times during the molding cycle.

This molding forces the elastomer on one side through the interstices 92 of the fabric to the opposite side of the fabric and results in the molded composite sheet 108' of the fabric having an elastomeric coating which is only one-ply deep but substantially covers the fibers on both sides of the fabric. Typically, after the molding is completed, the sheet 108' of molded diaphragms has a nominal thickness of about 0.007 to 0.010 of an inch.

The sheets 108' of molded diaphragms are cooled to room temperature and then cut and trimmed in a die 114 (FIG. 12) received in a reciprocating press 116 which cuts the individual diaphragms 40 from a single molded sheet 108' at a time. The individual finished diaphragms may then be packaged for shipment, installation and use.

Desirably, but not necessarily, the sealing gaskets 89 are bonded to the coated blank 108 during the molding operation. Individual gaskets may be die cut from a sheet of high density cellulose fiber reinforced material coated on one side with a suitable bonding agent or adhesive. The gaskets are placed in the mold on the blank 108 preferably with the adhesive facing the fabric side of the blank. The gaskets may be located in the mold with suitable locating pins projecting into the bolt mounting holes through each gasket. A suitable cellulose gasket material is commercially available as NV-512 from Specialty Paperboard, Inc. of Beaver Falls, New York 13305. A suitable vulcanizable bonding agent is commercially available as Thixon® OSN-2 from Whittaker, Dayton Chemicals Division, P.O. Box 127, West Alexandria, Ohio 45381.

Figure 13:
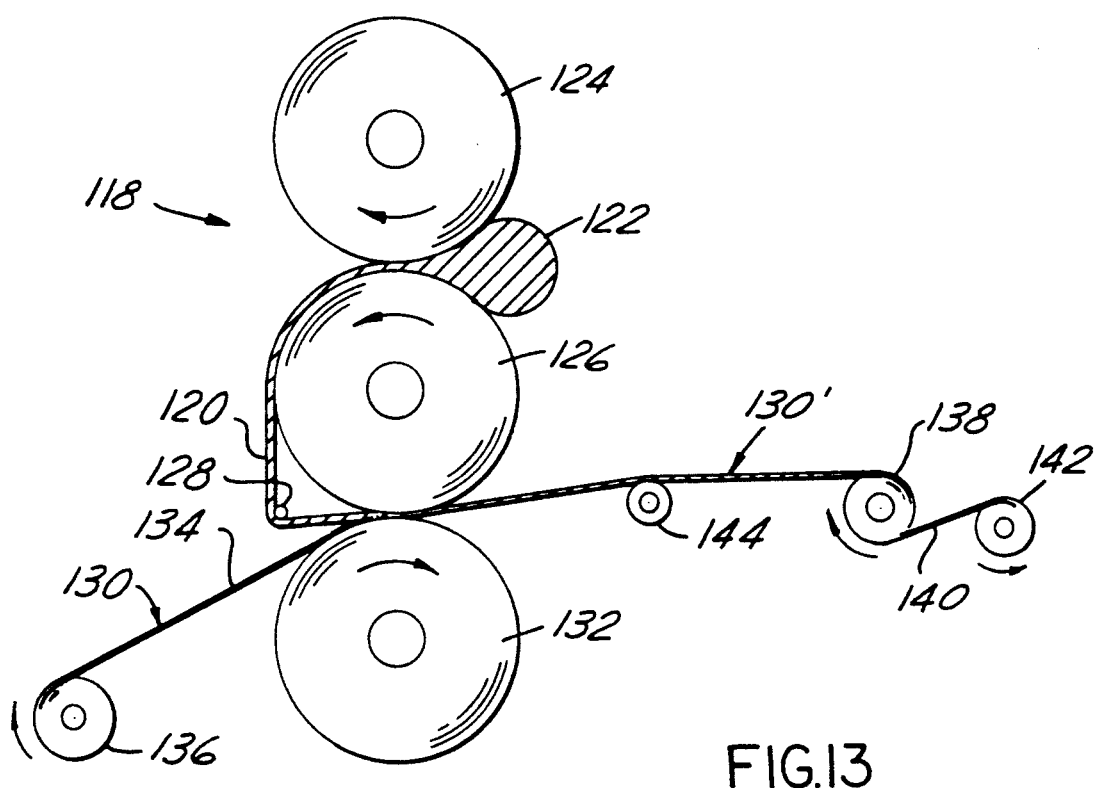
FIG. 13 is a semi-diagrammatic drawing of a preferred apparatus for applying an elastomer coating to only one side of the fabric in large volume production.

FIG. 13 illustrates an apparatus 118 and method for coating with a compounded elastomer a relatively large quantity of a knit fabric. A thin sheet 120 of the compounded elastomer is produced by disposing a quantity of the compounded elastomer 122 between a pair of co-rotating cylindrical rollers 124 and 126. The sheet 120 is stripped from the roller 126 by a stripper bar 128 and passed along with a web 130 of the knit fabric 86 between the nip of co-rotating cylindrical rollers 126 & 132 to calender the sheet of elastomer onto only one face 134 of the fabric. Typically, the sheet of elastomer has a nominal thickness of about 0.008 to 0.010 of an inch and the gap between the calendering rollers is adjusted to produce just enough force for the sheet of elastomer to adhere to the fabric. The web 130 of fabric is rolled on a reel 136 from which it is unwound as it passes between the calendering rollers.

The web of coated fabric 130' is wound on a take-up reel 138 along with a polyethelene sheet 140 received on a reel 142 to prevent the layers of uncured elastomer from sticking together. If desired, the web of coated fabric 130' can be supported on one or more driven rollers 144 disposed between the take-up reel 138 and the calendering rollers. The relative speed of the reel 136 unwinding the web 130 of fabric, the calendering rollers 126 and 132, the support roller 144 and the take-up reel 138 can be varied and adjusted within predetermined limits to properly tension the web 130 of fabric for application of the sheet 120 of elastomer thereto by the calendering rollers 126 and 132.

To facilitate substantially uniform tensioning of the web 130 of fabric, preferably each side edge is heated to provide a fused strip about 1" wide which is used in winding it on the reel 136, unwinding it, feeding it through the calender rollers, and winding it on the take-up reel 138. As previously indicated, these strips keep the fabric from necking down when tension is applied to the fabric during the coating process and minimize the stresses in the coated, molded and cured composite material of the finished diaphragms 40.

Preferably, the polyethelene sheet 140 has a smooth surface which permits any residual stresses in the coated fabric web 130', due to it having been tensioned, to relax and dissipate before the coated fabric is molded. If desired, rolls of coated fabric 130' with the polyethylene sheet between the layer can be stored for several weeks before molding by refrigerating it at a relatively low temperature of about 30° F. to 40° F. to prevent curing of the compounded elastomer.

When desired, the web of coated fabric 130' can be unrolled and cut into blanks of the appropriate size such as blanks 108, molded and trimmed in the same manner as previously described for blanks 108 to produce completely finished diaphragms 40.

The resulting diaphragms 40 are about 30% to 50% thicker and yet substantially more flexible than the prior art diaphragms made with a silk fabric. The resulting diaphragms have dramatically improved moisture and fuel resistance, durability and in service useful life, improved and more stable properties and dimensions, and are of economical manufacture.

What is claimed:

1. In a carburetor, a synthetic composite diaphragm having at least one side subject to contact with a liquid fuel, said diaphragm comprising: a fabric of warp knitted synthetic fibers with interstices therebetween, and an elastomeric polymer coating applied to only one side of the fabric, disposed in the interstices and cured to provide a barrier at least substantially impervious to liquid fuel.

2. A synthetic composite diaphragm as defined in claim 1 wherein
said elastomeric polymer coating is a polyacrylonitrile butadine rubber.

3. A synthetic composite diaphragm as defined in claim 1 wherein
said one side of the diaphragm with said elastomeric polymer coating applied thereon is subject to contact with liquid fuel.

4. A synthetic composite diaphragm as defined in claim 1 wherein
said elastomeric polymer extends from said one side of the diaphragm through the interstices to the opposite side thereof.

5. A synthetic composite diaphragm as defined in claim 1 wherein said synthetic fibers of the knit fabric are polyester fibers.

6. A synthetic composite diaphragm as defined in claim 1 wherein said synthetic fibers of the knit fabric are selected from the group consisting essentially of at least one of polyester, polyamide, polyaramide fibers and blends thereof.

7. A synthetic composite diaphragm as defined in claim 1 wherein said elastomeric polymer coating consists essentially of at least one of acrylonitrile butadiene, fluorosilicone and fluorocarbon polymers.

8. A synthetic composite diaphragm as defined in claim 1 wherein said fabric has a nominal thickness not greater than about 0.009 of an inch as determined per ASTM procedure D-1777.

9. A synthetic composite diaphragm as defined in claim 1 wherein said diaphragm has a nominal thickness not greater than about 0.010 of an inch.

10. A synthetic composite diaphragm as defined in claim 1 wherein said fabric has a nominal thickness not greater than 0.010 of an inch as determined per ASTM procedure D-1777.

11. A synthetic composite diaphragm as defined in claim 1 wherein said diaphragm has a nominal thickness not greater than about 0.010 of an inch.

* * * * *